(12) United States Patent
Reiter

(10) Patent No.: US 7,877,877 B2
(45) Date of Patent: Feb. 1, 2011

(54) METHOD FOR MANUFACTURING A SOLID HOUSING

(75) Inventor: Ferdinand Reiter, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 1273 days.

(21) Appl. No.: 10/582,180

(22) PCT Filed: Oct. 11, 2004

(86) PCT No.: PCT/EP2004/052915

§ 371 (c)(1),
(2), (4) Date: Jun. 8, 2006

(87) PCT Pub. No.: WO2005/061150

PCT Pub. Date: Jul. 7, 2005

(65) Prior Publication Data

US 2007/0113405 A1    May 24, 2007

(30) Foreign Application Priority Data

Dec. 20, 2003 (DE) .................. 103 60 327

(51) Int. Cl.
*B21K 1/20* (2006.01)
*B21B 23/00* (2006.01)
*B21C 37/08* (2006.01)
*B21D 19/00* (2006.01)

(52) U.S. Cl. ............................ 29/890.129; 29/890.131; 72/365.2; 72/367.1; 72/368; 72/369; 72/370.11; 138/171; 219/121.64; 228/178

(58) Field of Classification Search ............... 29/897.2, 29/890.124, 890.129, 890.131; 72/365.2, 72/367.1, 368, 369, 370.11; 138/171, 155; 219/121.63, 121.64; 228/144, 147, 150, 228/151, 178

See application file for complete search history.

(56) References Cited

U.S. PATENT DOCUMENTS 4,896,409 A    1/1990 Roesch et al.

(Continued)

FOREIGN PATENT DOCUMENTS

DE    35 02 287    7/1986

(Continued)

OTHER PUBLICATIONS

Machine Translation of EP0869265.*

(Continued)

*Primary Examiner*—David P Bryant
*Assistant Examiner*—Sarang Afzali
(74) *Attorney, Agent, or Firm*—Kenyon & Kenyon LLP

(57) ABSTRACT

A method for manufacturing a solid housing, in particular a valve housing for an electromagnetically operable valve. The method includes providing at least three flat metal plates side by side, each having different magnetic properties directly adjacent to the others. The at least three plates are joined to the directly adjacent bordering edges to form a sheet metal section. The sheet metal section shaped into a sleeve shape. Furthermore, the bordering edges, which are now opposite one another, and run in the longitudinal direction of the sleeve to form a sleeve blank are joined together. The sleeve blank is machined until a desired geometric shape of the housing is achieved. The housing may be suitable in particular for use in fuel injectors in fuel injector systems of internal combustion engines operating by spark ignition of a compressed fuel-air mixture.

7 Claims, 3 Drawing Sheets

U.S. PATENT DOCUMENTS

| | | | | |
|---|---|---|---|---|
| 5,456,405 | A | * | 10/1995 | Stagg .......................... 228/147 |
| 6,842,957 | B2 | * | 1/2005 | Van Giezen ................. 29/421.1 |
| 2006/0196035 | A1 | * | 9/2006 | Opperman ............... 29/525.11 |

FOREIGN PATENT DOCUMENTS

| | | |
|---|---|---|
| DE | 42 37 405 | 6/1993 |
| DE | 196 45 928 | 5/1998 |
| EP | 0 869 265 | 10/1998 |
| EP | 0 931 605 | 7/1999 |
| JP | 7-189852 | 7/1995 |
| JP | 2002-357167 | 12/2002 |
| JP | 2003-293899 | 10/2003 |
| WO | WO 01/74507 | 10/2001 |

OTHER PUBLICATIONS

Schneider, C., et al., "Tailored Blanks—Ein Werkstoff Fur Neue Formen Der Konstruktion.Ötailored Blanks—A Material for New Ways of Design", Thyssen Technische Berichte, Duisburg, Germany, No. 1, Jan. 1, 1992, pp. 97-106.

* cited by examiner

METHOD FOR MANUFACTURING A SOLID HOUSING

FIELD OF THE INVENTION

The present invention is directed to a method for manufacturing a solid housing.

BACKGROUND INFORMATION

FIG. 1 shows a conventional fuel injector having a traditional three-part design of an inner metal flow guidance part and housing component at the same time. This inner valve tube is formed by an inlet connection piece forming an internal pole, a nonmagnetic intermediate part and a valve seat carrier holding the valve seat, as explained in greater detail in the description of FIG. 1.

German Patent No. DE 35 02 287 A1 describes a method for manufacturing a hollow cylindrical metal housing having two magnetizable housing parts including a nonmagnetic housing zone between them, forming a magnetic isolation between the housing parts. This metal housing is premachined in one piece from a magnetizable blank down to an excess outside diameter, a ring groove being cut in the inside wall of the housing in the width of the desired middle housing zone. In the case of a rotating housing, a nonmagnetizable filler material is filled into the ring groove, while the ring groove area is heated up, and rotation of the housing is continued until the filling material solidifies. The housing is then turned on the outside down to the final dimension of the outside diameter, so that there is no longer a connection between the magnetizable housing parts. A valve housing manufactured in this way may be used, e.g., in solenoid valves for antilock brake systems (ABS) in motor vehicles.

In addition, methods for manufacturing a solid core for fuel injectors for internal combustion engines are described in German Patent No. DE 42 37 405 C2 (FIG. 5). These methods are characterized in that a one-piece sleeve-shaped magnetic martensitic workpiece which is provided directly or via prior transformation processes undergoes a local heat treatment in a middle section of the magnetic martensitic workpiece to convert this middle section into a nonmagnetic, austenitic middle section. Elements forming austenite and/or ferrite molten by laser during the local heat treatment are alternatively added at the site of the heat treatment to form a nonmagnetic, austenitic middle section of the solid core.

SUMMARY

A method according to an example embodiment of the present invention for manufacturing a solid housing may have the advantage that housings having a magnetic isolation may be reliably mass produced in a particularly simple and inexpensive method. Due to the simplicity of the individual components, the complexity and expenditure in terms of special tools are reduced in comparison with conventional manufacturing methods. In addition, the example method according to the present invention allows high flexibility in the choice of materials because various materials may be used according to the present invention for the individual sheets of sheet metal plate to be used.

It is also advantageous that great flexibility may be possible in the design of the geometry of the housing itself, e.g., in the length, outside diameter and gradations.

Due to the industrial mass manufacture of the housing, the welds which are critical in the usual manufacturing technology may be optimized here for process reliability due to the good accessibility and optimizable parameters.

BRIEF DESCRIPTION OF THE DRAWINGS

An exemplary embodiment of the present invention is shown in simplified form in the figures and is explained in greater detail below.

DETAILED DESCRIPTION OF EXAMPLE EMBODIMENTS

Before describing the method steps of the method for manufacturing a solid housing according to an example embodiment of the present invention with reference to FIGS. 2 through 5, a conventional fuel injector is explained in greater detail below with reference to FIG. 1 as a possible insert product for a housing manufactured according to the example embodiment of the present invention.

Figure 1:
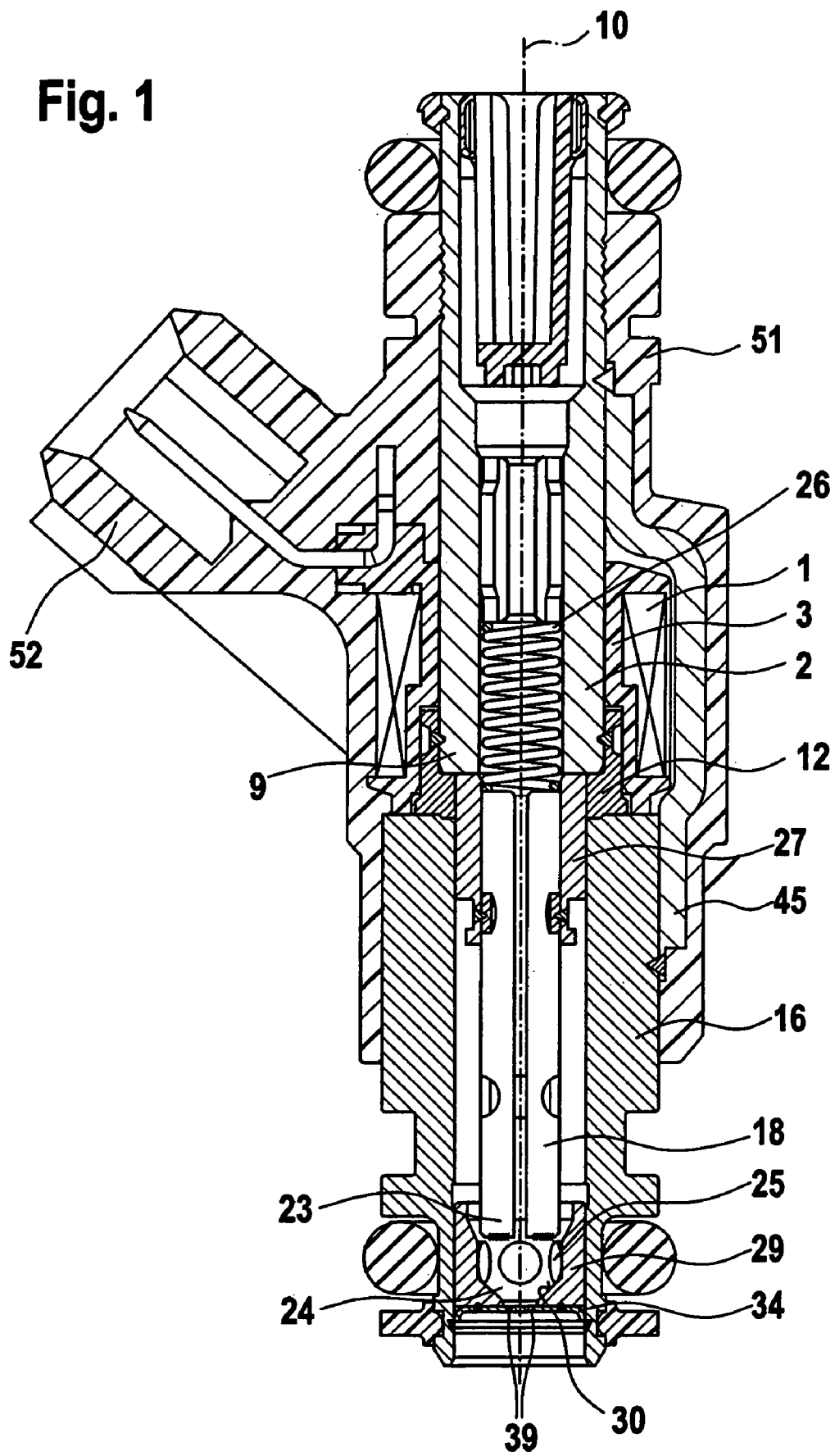
FIG. 1 shows a conventional fuel injector having a three-part inner metal valve tube as a housing.
Figure 2:
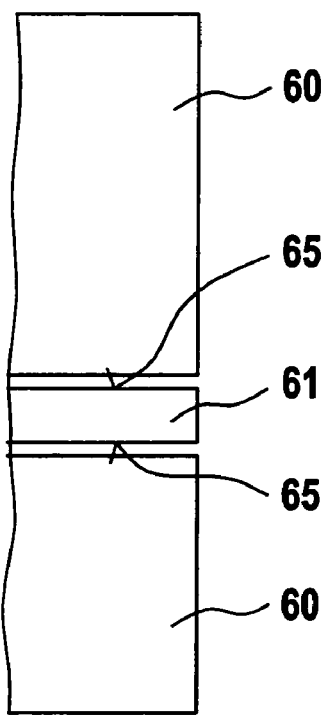
FIGS. 2 through 5 schematically show method steps of a method for manufacturing a solid housing according to an example embodiment of the present invention.

The electromagnetically operable valve as shown in FIG. 1, for example, in the form of a fuel injector for fuel injection systems of internal combustion engines operating by spark ignition of a compressed fuel-air mixture has a tubular core 2 surrounded by a magnet coil 1, functioning as the fuel inlet connection piece and internal pole. The tubular core has a constant outside diameter over its entire length, for example. A coil body 3 having steps in the radial direction receives a winding of magnet coil 1 and, in combination with core 2 permits a compact design of the fuel injector in the area of magnet coil 1.

A tubular nonmagnetic metallic intermediate part 12 is joined tightly by welding to a lower core end 9 of core 2 concentrically with a longitudinal valve axis 10 and surrounds core end 9 axially in part. A tubular valve seat carrier 16 is fixedly joined to intermediate part 12 and extends downstream from coil body 3 and intermediate part 12. An axially movable valve needle 18 is situated in valve seat carrier 16. A spherical valve closing body 24 provided on downstream end 23 of valve needle 18 has, for example, five flat areas 25 on its circumference to allow fuel to flow past it.

The fuel injector is operated electromagnetically by the conventional method. The electromagnetic circuit having magnet coil 1, core 2 and an armature 27 is used to produce the axial movement of valve needle 18 and thus to open the valve against the spring force of a restoring spring 26 and/or for closing the fuel injector. Tubular armature 27 is fixedly joined, e.g., by a weld to one end of valve needle 18 facing away from valve closing body 24 and is aligned with core 2. A cylindrical valve seat body 29 having a fixed valve seat 30 is tightly mounted by welding into the downstream end of valve seat carrier 16 facing away from core 2.

Spherical valve closing body 24 of valve needle 18 cooperates with valve seat 30 of valve seat body 29 tapering in the form of a truncated cone in the direction of flow. On its lower end face, valve seat body 29 is fixedly and tightly joined to an injector perforated splash disk 34 designed in the form of a pot, for example, the joint being formed by a weld created using a laser, for example. At least one, e.g., four injector openings 39 shaped by erosion or punching are provided in injector perforated splash disk 34.

To direct the magnetic flux to armature 27 for optimum operation of armature 27 when current is applied to magnet coil 1 and thus for secure and accurate opening and closing of the valve, magnet coil 1 is surrounded by at least one, for example, bow-shaped guide element 45 and functions as a ferromagnetic element, at least partially surrounding magnet coil 1 in the circumferential direction and is in contact with core 2 at one end and with valve seat carrier 16 at its other end and is joinable to them by welding, soldering and/or gluing, for example. Core 2, nonmagnetic intermediate part 12 and valve seat carrier 16, which are fixedly joined together and extend as a whole over the entire length of the fuel injector, form an inner metal valve tube as the basic structure and thus also the housing of the fuel injector. All other function groups of the valve are situated inside or around the valve tube. This arrangement of the valve tube is a classic three-part design of a housing for an electromagnetically operable unit such as a valve having two ferromagnetic, i.e., magnetizable housing areas which are isolated magnetically from one another by a nonmagnetic intermediate part 12 for effective conduction of the magnetic circuit lines in the area of armature 27 or are at least joined together by a magnetic restriction.

The fuel injector is mostly surrounded by a plastic sheathing 51 which extends starting from core 2 axially over magnet coil 1 and the at least one conducting element 45 to valve seat carrier 16, at least one conducting element 45 being completely covered axially and circumferentially. An integrally molded electric plug 52, for example, is part of this plastic sheathing 51.

Using the method steps of the method for manufacturing a solid housing according to the present invention as schematically indicated in FIGS. 2 through 5, it is possible in an advantageous manner to manufacture housings 66 having thin walls for a variety of purposes, preferably for electromagnetically operable valves that may replace a three-part valve tube as described above and to do so in a particularly simple and inexpensive manner.

Figure 5:
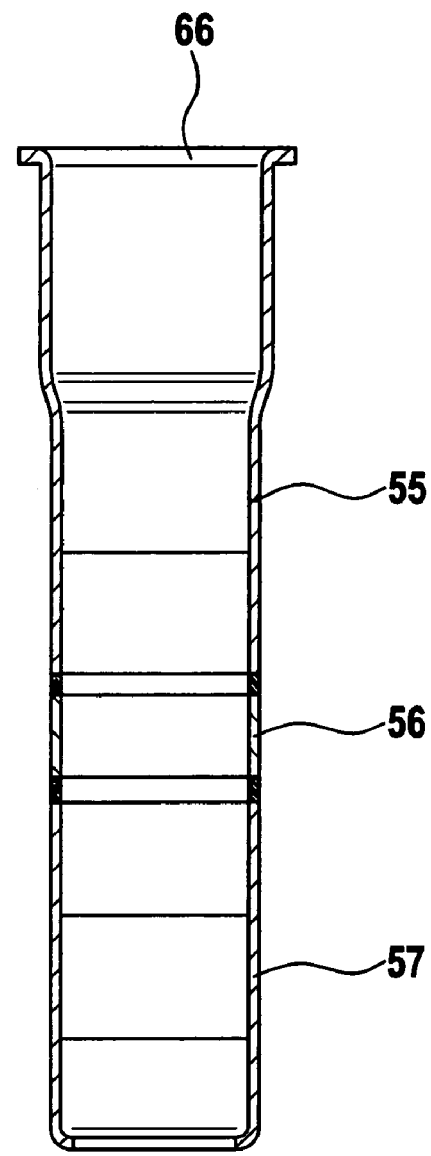

In a first method step (FIG. 2), three flat sheet metal plates 60, 61 in the form of sheet metal strips are provided, two outer plates 60 being made of a magnetic or magnetizable, material and being ferromagnetic or ferritic, for example, and middle plate 61 inserted between these two plates 60 being made of a nonmagnetic material and having an austenitic structure, for example. These plates 60, 61 to be provided are flat rolled sheet metal sections that have been machined accurately and cut to size and are referred to as tailored blanks. Three plates 60, 61 will ultimately form three directly adjacent zones 55, 56, 57 on completed housing 66, each zone having different magnetic properties due to the material selected. However, zones 55 and 57, which are separated by zone 56, may be made of the same material having the same magnetic properties (FIG. 5).

Figure 3A:
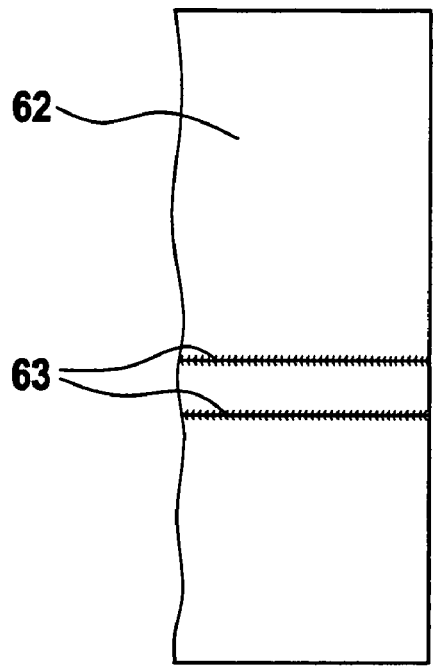
Figure 3B:
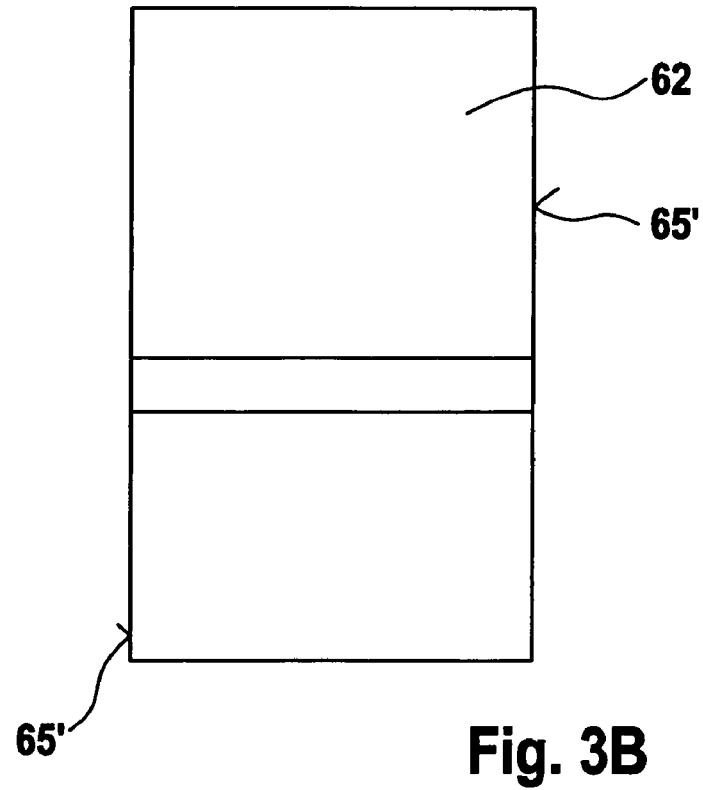

Three plates 60, 61 are joined together tightly and permanently by a joining method, e.g., laser welding, in a planar state and aligned with one another at their two abutting areas opposite bordering edges 65 of plates 60, 61 directly adjacent thereto. FIG. 3A shows a flat sheet metal section 62 composed of three original plates 60, 61, nonmagnetic plate 61 in the middle being attached to two opposite plates 60 on the outside by two welds 63 so that ultimately there is only one sheet metal section 62 having three zones. FIG. 3B illustrates the sheet metal section 62, which may also be referred to as a laminated plate, after remachining which might be necessary in the area of the joints between three plates 60, 61.

Figure 4:
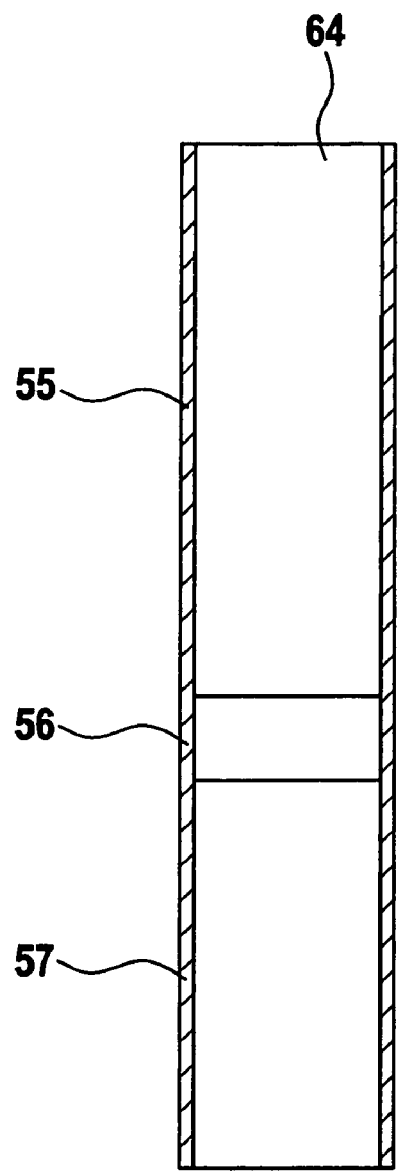

In another machining step, sheet metal section 62 which is present in this form is made into a sleeve form by rolling or bending, namely to a state in which two bordering edges 65' which extend over all three zones 55, 56, 57 of sheet metal section 62 are close together opposite one another and/or come in contact with each other. For example, a mandrel-type tool may be used here. This method step yields a sleeve-shaped blank 64 whose two opposing bordering edges 65' extending longitudinally form butt edges which are joined together. This joining of bordering edges 65' of rolled sheet metal section 62 together may also be performed by laser welding. FIG. 4 shows a sleeve-shaped blank 64 which is closed in the circumferential direction and has three zones 55, 56, 57 after rolling and welding bordering edges 65'.

Finally, sleeve-shaped blank 64 is subjected to final machining to obtain solid housing 66 in the desired geometry. In the case of use of a housing 66 manufactured according to the present invention in a fuel injector, it may be advantageous to shape housing 66 by using such manufacturing methods as stretching, rolling, flanging and/or welding with a single U-groove weld. As FIG. 5 shows, such a sleeve-shaped housing 66 may have flanged edges on both ends and may have stepwise widened or constricted areas in the central sections. Housing 66 is a component capable of completely assuming the functions of the valve tube composed of core 2, intermediate part 12 and valve seat carrier 16 in a conventional fuel injector shown in FIG. 1, and it may thus also extend over the entire axial length of a fuel injector, for example.

The present invention is not limited to use in fuel injectors or solenoid valves for antilock brake systems, but instead it also pertains to all electromagnetically operable valves of different areas of application and in general all solid housings in units in which zones 55, 56, 57 of differing magnetism are necessary in succession. Thus, not only housing 66 having three successive zones 55, 56, 57 may be manufactured by the method according to the present invention but also housings 66 having more than three zones 55, 56, 57 may be manufactured by this method.

What is claimed is:

1. A method for manufacturing a solid valve housing for an electromagnetically operable valve, wherein the housing has at least three zones, two directly adjacent ones of the zones having different magnetic properties, the method comprising:

providing at least three flat sheet metal plates side by side, each having different magnetic properties directly adjacent to the others;

joining the at least three sheet metal plates at directly adjacent bordering edges to form a sheet metal section;

shaping the sheet metal section into a sleeve shape;

joining together the bordering edges, which are now opposite one another and run in a longitudinal direction of the sleeve, to form a sleeve blank; and final machining the sleeve blank until a desired geometry of the housing is achieved;

wherein two outer ones of the sheet metal plates are made of a magnetic material, and a middle one of the sheet metal plates between the two outer ones of the sheet metal plates is made of a nonmagnetic material.

2. The method as recited in claim 1, wherein the outer ones of the sheet metal plates are ferromagnetic or ferritic, and the middle one of the sheet metal plates is austenitic.

3. The method as recited in claim 1, wherein the sheet metal plates are initially in a form of flat rolled sheet metal sections cut to size.

4. The method as recited in claim 1, wherein the sheet metal plates are joined at the directly adjacent bordering edges by laser welding.

5. The method as recited in claim 1, wherein the sheet metal section is shaped into a sleeve shape by rolling or bending.

6. The method as recited in claim 1, wherein the bordering edges which are on opposite sides after shaping and run in the longitudinal direction of the sleeve are joined by laser welding.

7. The method as recited in claim 1, wherein the machining of the sleeve blank is performed by at least one of drawing, rolling, flanging, and welding with a single U-groove weld.

* * * * *

UNITED STATES PATENT AND TRADEMARK OFFICE
CERTIFICATE OF CORRECTION

PATENT NO.        : 7,877,877 B2
APPLICATION NO.   : 10/582180
DATED             : February 1, 2011
INVENTOR(S)       : Ferdinand Reiter It is certified that error appears in the above-identified patent and that said Letters Patent is hereby corrected as shown below:

On the face of the patent (22) change "October 11, 2004" to --November 10, 2004--

Signed and Sealed this
Thirtieth Day of August, 2011

David J. Kappos
*Director of the United States Patent and Trademark Office*